(12) United States Patent
Schmidt

(10) Patent No.: US 6,215,389 B1
(45) Date of Patent: Apr. 10, 2001

(54) TIME-INDEPENDENT, EVENT-BASED SYSTEM FOR RECEIVING AND DISCRIMINATING UNIQUE CODES FROM MULTIPLE TRANSMITTERS AND METHOD FOR DOING THE SAME

(75) Inventor: David J. Schmidt, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/291,348

(22) Filed: Apr. 14, 1999

(51) Int. Cl.$^7$ ........................................................ G06F 7/00
(52) U.S. Cl. .................... 340/5.1; 340/5.27; 340/442; 340/447; 340/448; 340/443
(58) Field of Search ..................... 340/442, 447, 340/448, 443, 825.3, 5.1, 5.27

(56) References Cited

U.S. PATENT DOCUMENTS

| | | |
|---|---|---|
| 4,210,357 | 7/1980 | Adachi . |
| 4,510,484 | 4/1985 | Snyder . |
| 4,672,375 | 6/1987 | Mochida et al. . |
| 4,734,674 | 3/1988 | Thomas et al. . |
| 4,761,645 | 8/1988 | Mochida . |
| 4,868,915 | 9/1989 | Anderson, III et al. . |
| 4,873,530 | 10/1989 | Takeuchi et al. . |
| 4,966,034 | 10/1990 | Bock et al. . |
| 4,970,491 | 11/1990 | Saint et al. . |
| 4,978,941 | 12/1990 | Brown . |
| 5,001,457 | 3/1991 | Wang . |
| 5,061,917 | 10/1991 | Higgs et al. . |
| 5,463,374 | 10/1995 | Mendez et al. . |
| 5,504,478 | 4/1996 | Knapp . |
| 5,512,901 | 4/1996 | Chen et al. . |
| 5,581,023 | 12/1996 | Handfield et al. . |
| 5,600,301 | 2/1997 | Robinson, III . |
| 5,612,671 | 3/1997 | Mendez et al. . |
| 5,774,048 | 6/1998 | Achterholt . |
| 6,043,738 | * 3/2000 | Stewart et al. ....................... 340/447 |

\* cited by examiner

Primary Examiner—Michael Horabik
Assistant Examiner—William L Bangachon
(74) Attorney, Agent, or Firm—Price, Heneveld, Cooper, DeWitt & Litton; Brian J. Rees (57) ABSTRACT

A time-independent, event-based system for receiving and discriminating unique codes from multiple transmitters has an event-based detection cycle instead of a time-based detection cycle. The system detects received ID codes from multiple transmitters and compares the received ID codes with registers for ID codes in an array in memory. Counters corresponding to the stored ID codes increment each time there is a match between the received ID code and the stored ID code. After a predetermined total number of increments, the system evaluates the received signals to discriminate between ID codes received from desired transmitters and those from undesired transmitters before resetting the counter. Because the system is event based and not a function of time, it will operate over a wide range of time cycles.

19 Claims, 8 Drawing Sheets

TIME-INDEPENDENT, EVENT-BASED SYSTEM FOR RECEIVING AND DISCRIMINATING UNIQUE CODES FROM MULTIPLE TRANSMITTERS AND METHOD FOR DOING THE SAME

BACKGROUND OF THE INVENTION

1. Field of the Invention

The invention relates to a system and a method for receiving and discriminating unique codes from multiple transmitters. More particularly, the invention relates to an event-based system and method for receiving unique codes from multiple transmitters, such as tire pressure sensors, and building a table of those unique codes so that data received from the remote sources can be identified and validated.

2. Related Art

With the development of systems monitoring equipment for vehicles, it is known to monitor the pressure in a vehicle's tires by installing a transducer within each vehicle tire which can provide a perceptible indication of the pressure to the vehicle operator. These indications have included: a visible signal provided on the tire whereby the tire must be visually inspected by the operator, a magnetic field generated by the transducer which generates a warning on the instrument panel for the operator via a detector hard wired near the tire, and a radio transmitter interconnected to the transducer within each tire which provides a wireless signal to a receiver on the vehicle for providing a warning to the operator.

In the wireless tire pressure sensing and indication system mentioned above, transmitters are mounted within each tire which communicate with a receiver. The receiver is interconnected with a display device which can display whether any of the four tires has a low pressure condition. In order to distinguish between each of the tire-mounted transmitters, each of the transmitters is coded with a unique identification number (ID) indicating a particular tire position. Each of the transmitters thereby transmits a data frame containing both the ID and a signal corresponding to the pressure in the particular tire.

Because vehicles are often located nearby one another during operation, it is conceivable that the receiver could detect a signal from a neighboring vehicle and erroneously record the pressure signal as relating to the vehicle in which the receiver is mounted. Further, erroneous signals could also be recorded when the tires are rotated. Yet, further erroneous signals may result if the ID data is corrupted in a volatile memory location. It has been found to be important that a wireless tire pressure monitoring system be able to "learn" the IDs of the tire pressure transmitters associated with the vehicle.

Various solutions have been proposed to the problem of enabling the receiver to learn the IDs. One solution requires the operator of the vehicle to hold a magnet adjacent to each tire which causes the transmitter associated therewith to "wake up" and send a transmission containing the ID to the receiver. Another solution is proposed in U.S. Pat. No. 5,612,671, issued Mar. 18, 1997, titled "Method of Learning Tire Pressure Transmitter ID" ("the '671 patent"), wherein the receiver includes a microprocessor controller programmed to learn the IDs of the tire senders by recording the IDs in the controller memory as "main" senders presumed to be those on the vehicle wheels wherein subsequent new IDs are accepted as "reserve" senders. The '671 patent, however, detects faulty transmitters by measuring the number of transmission failures over a predetermined time period; transmission failures for every ID during the time period are stored as flags, and detection of faulty transmitters is conducted only after the time period expires for a given cycle. Because different transmitters often send signals at different rates, the predetermined time period selected in the '671 system may not be compatible with a particular set of transmitters, making the system less reliable. Thus, the effectiveness of the '671 system depends on the compatibility between the transmission rate of the transmitters and the predetermined time period in the system. If the predetermined time period is not adjustable by the user, this restriction unduly limits the user's selection of transmitters because the selected transmitter's transmission rate must be compatible with that time period.

There is a need for a time-independent, event-based system that operates independently of the transmission rate of the transmitters being sensed.

SUMMARY OF THE INVENTION

Accordingly, the present invention is directed to a method and apparatus for discriminating between ID codes from desired transmitters and ID codes from undesired transmitters using a time-independent, event-based system. An array in memory has registers corresponding to ID codes from a group of desired transmitters. Each register has a corresponding ID code counter. The system also has an event counter. When an ID code is received from a transmitter, the system increments the event counter, and checks to see if the received ID code matches an ID code in the registers. If the received ID code matches an ID code or if the register is clear, the ID code counter corresponding to that register increments. Any register whose associated ID counter is below a predetermined ID counter threshold when the event counter exceeds a predetermined event counter threshold is cleared. Thus, ID codes from undesired transmitter can be cleared from the array.

In another embodiment, an auxiliary array with auxiliary registers and corresponding auxiliary ID code counters is provided, and matching and incrementing is conducted in a similar manner. In this embodiment, ID codes in the auxiliary array are made available to the main array by a checking routine. The system is especially adapted for use with automatically learning the ID codes from tire pressure senders in vehicles.

The auxiliary ID codes and associated code counters are used for main ID code replacement, which can occur, for example, if a car has a replacement tire with a transmitter having a new ID code. The system checks to see if the number of inactive ID codes matches the number of auxiliary ID codes that have counters exceeding a predetermined threshold, indicating an active auxiliary ID code. If so, the system moves the active auxiliary codes to the main array to replace the inactive main ID codes. If the number of inactive ID codes does not match the number of active auxiliary ID codes, the system provides an error message. The invention therefore does not require evaluating the number of event occurrences over a predetermined time period, but instead compares the number of events with time-independent thresholds.

Other objects, features, and advantages of the invention will be apparent from the ensuing description in conjunction with the accompanying drawings.

DETAILED DESCRIPTION

Figure 1:
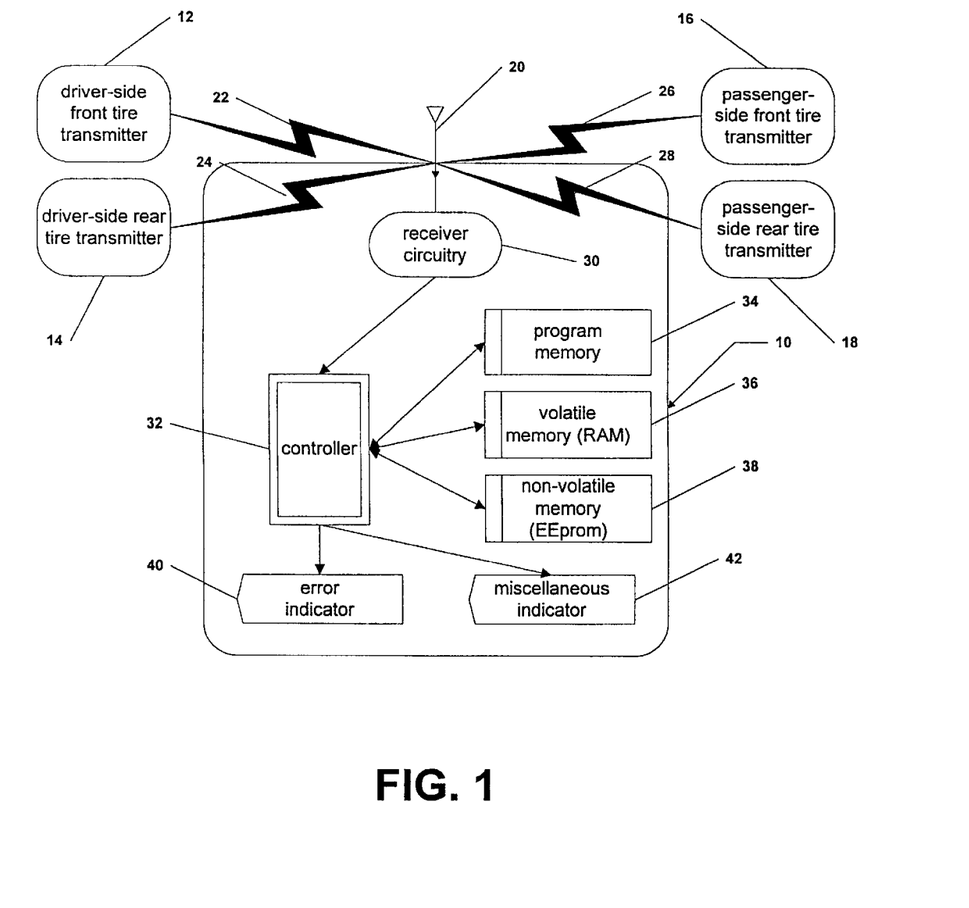
FIG. 1 is a schematic circuit diagram of a system for receiving and discriminating unique codes for multiple transmitting sources according to the invention.

Referring now to the drawings and to FIG. 1 in particular, a system 10 for receiving and discriminating unique codes for multiple transmitting sources such as tire transmitters 12, 14, 16 and 18 is shown and described. The system 10 includes an antenna 20, that receives signals 22, 24, 26, and 28 from, for example, the driver side front tire transmitter 12, driver side rear transmitter 14, passenger side front tire transmitter 16 and passenger side rear tire transmitter 18. The antenna 20 is interconnected to conventional receiver circuitry 30, which in turn, is interconnected to a microcomputer controller 32. The controller 32 is adapted to receive signals from the receiver circuitry 30 and identify unique codes transmitted by the transmitters 12–18.

The controller 32 is connected to a program memory 34 that stores the necessary program instructions to run the controller 32, a bank of random access memory 36 (RAM), often referred to as volatile memory, and a non-volatile memory bank 38 (EEPROM) for storing data after the system 10 has been powered down. The controller 32 is also connected to an error indicator 40 and a miscellaneous indicator 42 which are adapted to provide indications such as alerts to a low tire pressure and/or various data relating to the information signals 22–28 received from the tire transmitters 12–18 such as tire pressure, and other desired values.

Figure 2:
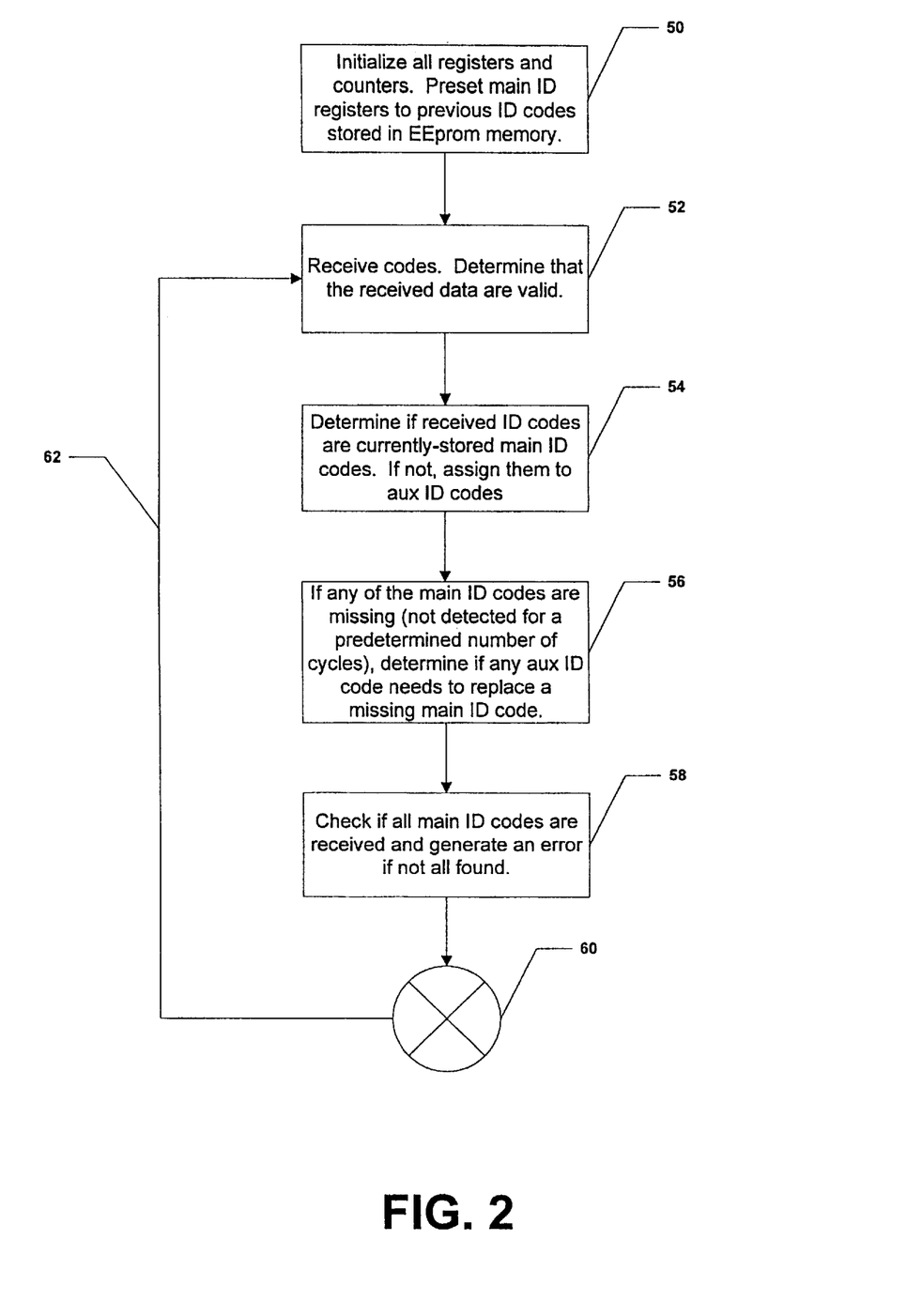
FIG. 2 is a flow chart showing a method for performing the functions of the system of FIG. 1 identifying broad steps of operation therefor.

FIG. 2 shows a flow chart identifying broad process steps performed by the controller 32. The controller 32 operates to define a main array, a main counter, an auxiliary array and an auxiliary counter <50>. The main array contains registers adapted to store the IDs determined to correspond to the transmitters located on the tires of the vehicle. The main counter corresponds to an "activity" rating for each element of the main array—each time an ID contained in the main array is detected, the main counter is incremented. The same applies to the auxiliary array and the auxiliary counter in the same manner. These counters, rather than a timer, provide the reference for identifying active transmitters; the process cycle is determined by the number of events (e.g. the number of times received IDs match stored IDs), not by a time period. Thus, any transmitter, having any transmission rate, can be used in the inventive system with equal effectiveness. An initialization step is performed whereby these arrays and counters are reset. Optionally, the contents of the EEPROM can be written to the main register to "preload" the main array with previously-detected values for the transmitter IDs (if saved into the EEPROM at shutdown).

Once the main and auxiliary registers and counters are initialized at power-up, the receiver receives signals from the transmitters containing the IDs and determines whether the received IDs are valid <52>. This is accomplished by determining whether the received ID code is currently stored in one of the elements of the main array. If so, the main counter corresponding to that element of the main array is incremented to watch the activity of that ID code stored in the main array <54>. If not, the received ID code is compared to any ID codes stored in the auxiliary array. If a match is found in the auxiliary array, the auxiliary counter corresponding to that element of the auxiliary counter is incremented. If not, the received ID code is assigned to an element of the auxiliary array.

The controller 32 then sums the main and auxiliary counters and determines whether a predetermined number of signals have been received by the receiver <56>. At this point, the controller 32 performs a check of the activity of each of the elements of the main array by checking the values of the main counter elements. If any of the main array elements are missing (i.e., its corresponding counter equals zero for a predetermined number of event cycles), the controller determines whether any auxiliary array elements need to replace any missing main array elements <56>. Thus, the most recently received active ID codes are maintained in the main array. Further, because ID codes not found in the main array are immediately stored in the auxiliary array, any transient signals, such as those emitted by a transmitter located adjacent to the instant vehicle for a transient period, are not mistakenly recorded into the main array as an ID code located on the vehicle.

If any missing ID codes of the main array do not have a corresponding new ID code in the auxiliary array, an error signal is generated to the vehicle operator <58>. The main routine ends <60> and processing returns to <52> via loop <62>.

Figure 3:
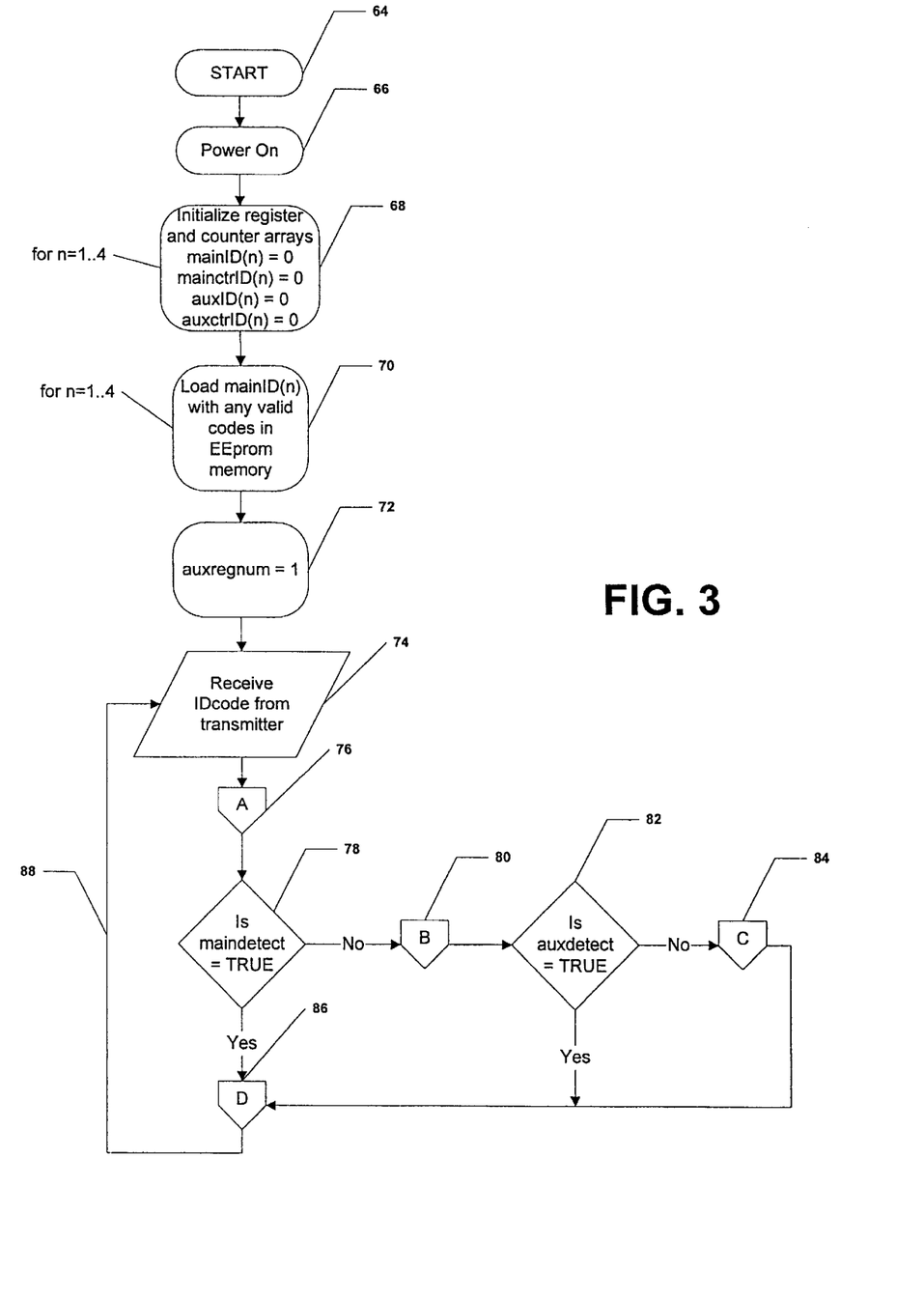
FIG. 3 is a flow chart showing the steps of the method of FIG. 2 in greater detail.

FIG. 3 is a flow chart showing the steps of the method of FIG. 2 in greater detail and provides additional steps performed by the controller 32 identified in FIG. 2. Once started <64> and powered on <66>, the controller 32 defines four arrays, each having four elements corresponding to the front and rear driver-side and front and rear passenger-side transmitters 12–18. These arrays are referred to as mainID(n), mainctrID(n), auxID(n) and auxctrID(n) where n is an integer ranging from 1 to 4 <68>.

With reference to the above description of FIG. 2, mainID(n) refers to the main array storing the ID codes determined to correspond to the transmitters 12–18 on the vehicle. mainctrID(n) refers to the main counter array identifying the number of times the corresponding element of mainID(n) has been detected by the receiver 30. auxID(n) refers to the auxiliary array storing the ID codes not determined to correspond to the transmitters 12–18 on the vehicle but which are stored for later possible substitution into mainID(n). auxctrID(n) refers to the auxiliary counter array identifying the number of times the corresponding element of auxID(n) has been detected by the receiver 30.

The above-identified register and counter arrays are initialized, i.e., mainID(n)=0, mainctrID(n)=0, auxID(n)=0, and auxctrID(n)=0 for each n from 1 to 4 <68>. If any valid codes from mainID(n) were stored in the EEPROM 38 before the last power down of the system 10, they can be reloaded into mainID(n) <70>. The controller 32 also defines a variable corresponding to the particular array element in auxID(n) in which newly read codes determined to not be found in mainID(n) are to be loaded. This variable, referred to as auxregnum, is initially set to a value of 1, signifying that codes not found in mainID(n) are to be loaded into the first array element of auxID(n), namely, auxID(auxregnum) <72>.

A data frame containing an ID code, referred to as IDcode, is then detected by the receiver circuitry 30 through the antenna 20 and is sent to the controller 32 <74>.

Figure 4:
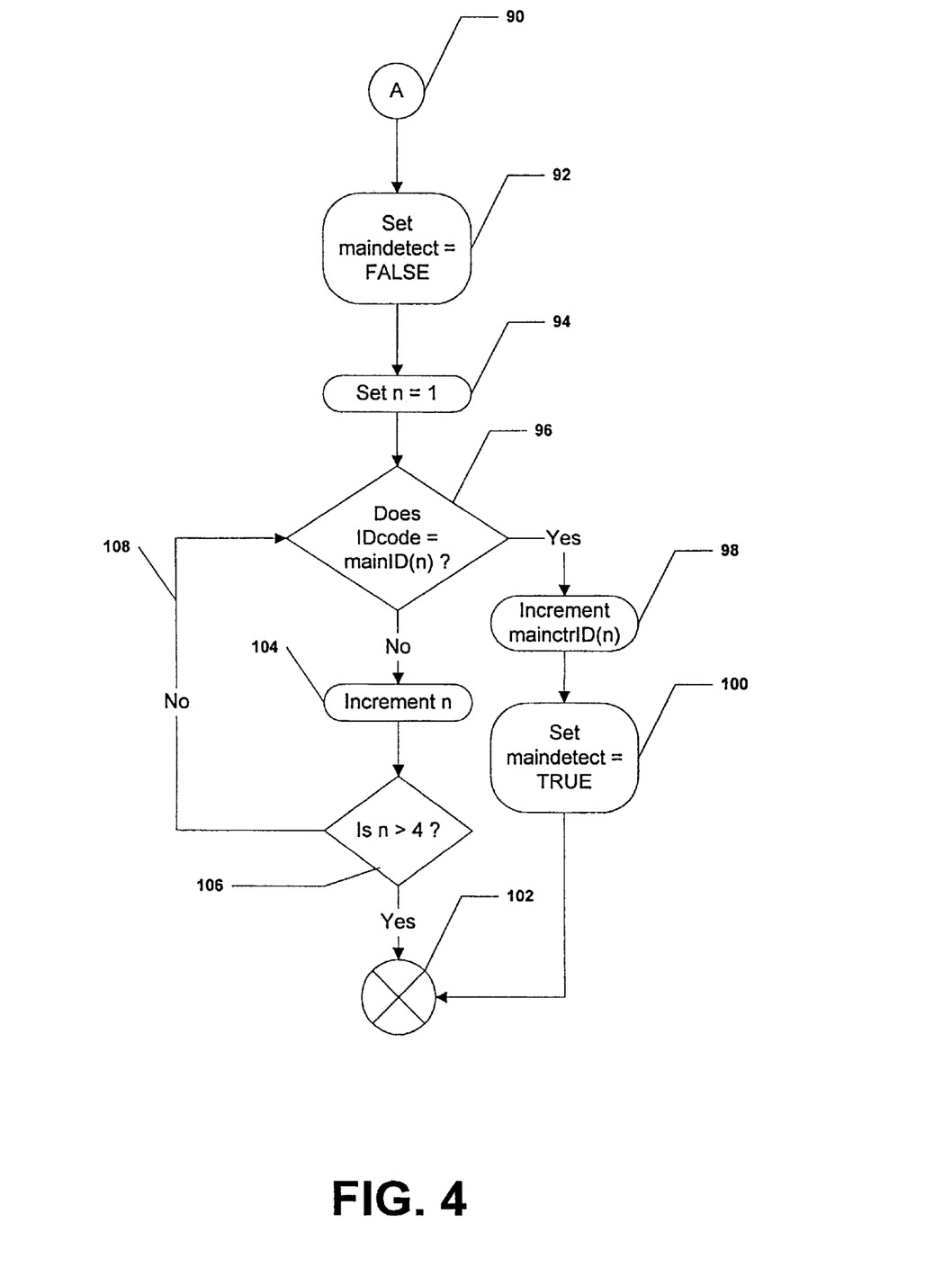
FIG. 4 is a flow chart identifying the event block "A" of FIG. 3.

Processing in the controller 32 then passes to the event block shown as "A" <76> in FIG. 3. FIG. 4 shows the subroutine corresponding to the event block "A" <76>, <90>. First, a Boolean flag variable maindetect is initially set to a value of FALSE <92>. maindetect is used as a flag which is set to TRUE when IDcode matches an element of the mainID(n) array. To check whether IDcode matches an element of mainID(n), the following steps are performed. A counter variable n is set to 1 <94>. A compare is done to determine whether IDcode is equal to mainID(n) <96>.

If this condition is true, the counter associated with that element of the mainID array is incremented, namely, mainctrID(n) is incremented <98> and the flag variable maindetect is set to a value of TRUE <100>. If this condition is false, the counter variable n is incremented <104>. If n exceeds 4 <106>, processing returns from event block "A" <102>, shown in FIG. 4, to its processing origin in FIG. 3 <76>. If n does not exceed 4, processing returns <108> to compare IDeode with the next element of the mainID(n) array <96>.

Once processing returns <102> from event block "A" (FIG. 4) to FIG. 3 <76>, a compare step <78> is performed to determine whether maindetect is equal to TRUE. If not, processing <80> passes to event block "B" <110> (FIG. 5) to determine whether IDcode equals any elements of the auxID(n) array. If maindetect equals TRUE, processing passes <86> to event block "D" <144> (FIG. 7) to determine whether a sufficient number of IDcodes have been detected to indicate the systems' readiness to determine whether any array elements in the auxiliary auxID(n) array need to be written over any inactive elements in the mainID(n) array.

As processing passes <80> to event block "B" <110> (FIG. 5) when maindetect does not equal TRUE in the compare step <78>, a flag variable auxdetect is initially set to a value of FALSE <112> to indicate that IDcode has not been detected as being previously loaded into a particular array element of the auxID(n) array. To determine whether IDcode matches any array elements of auxID(n), a counter variable n is initialized at a value of 1 <114>.

Figure 5:
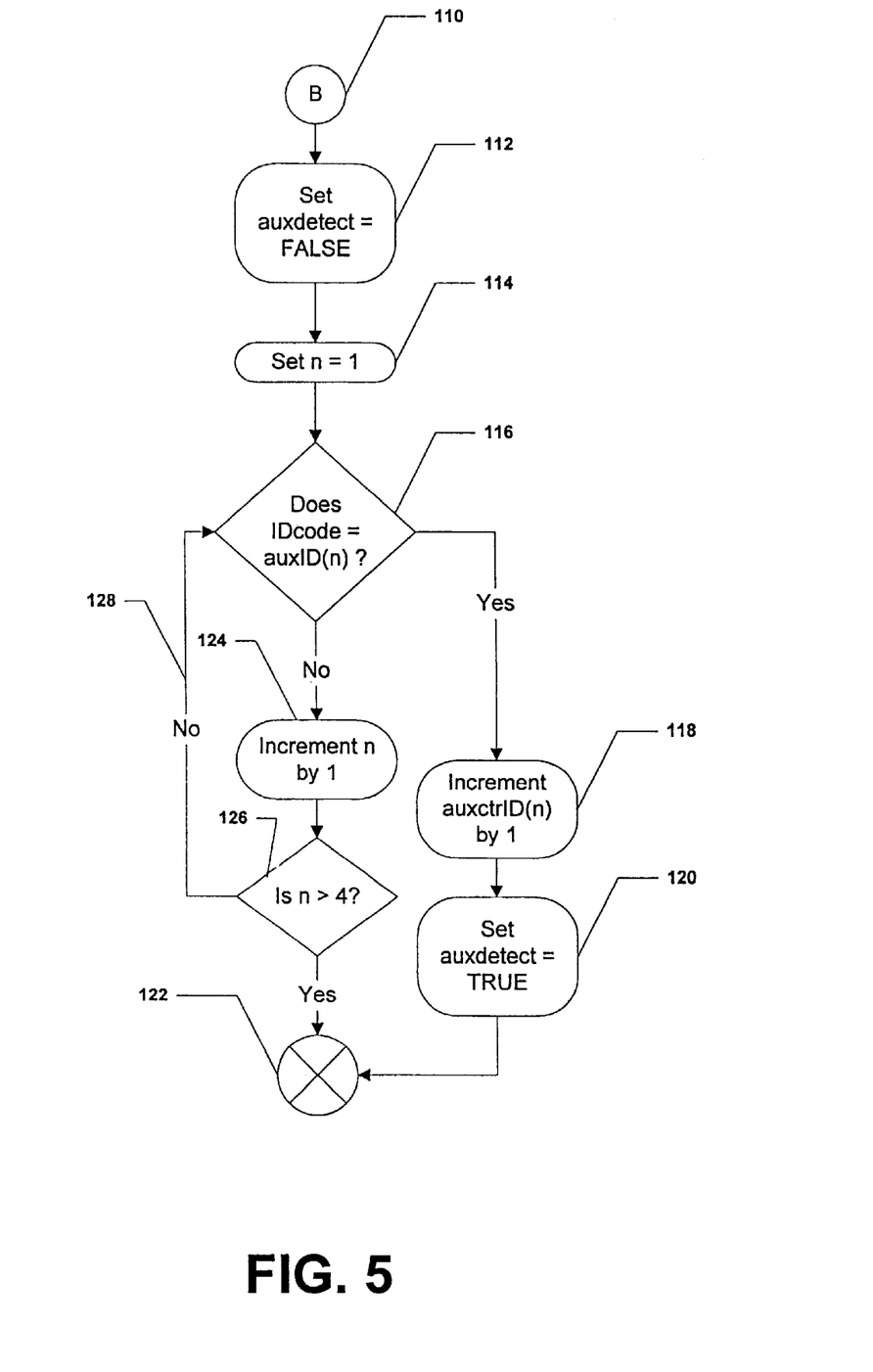
FIG. 5 is a flow chart identifying the event block "B" of FIG. 3.

A compare step <116> is then performed to determine whether IDcode is equal to auxID(n). If this condition is met, the counter auxctrID(n) associated with the auxID(n) is incremented <118> and the variable auxdetect is set to a value of TRUE <120> to indicate that IDcode has indeed matched a value in the auxID(n) array. If this condition is not met, the counter variable n is incremented <124> and is determined whether it has exceeded a value of 4 <126>. If n does exceed 4, processing returns <122> to the point it left the main routine of FIG. 3 <80>. If n does not exceed 4, processing returns <128> to the compare step <116> to determine whether IDcode matches the next element of the auxID(n) array.

Once processing returns <122> to the main routine of FIG. 3 <80> from event block "B" (FIG. 5), a compare step <82> is performed to determine whether auxdetect has been set to a value of TRUE, indicating that IDcode did match a value of the auxiliary array auxID(n). If the compare step <82> is true, processing passes <86> to event block "D" <144> (FIG. 7). If the compare step <82> is false, processing passes <84> to event block "C" <130> (FIG. 6).

Figure 6:
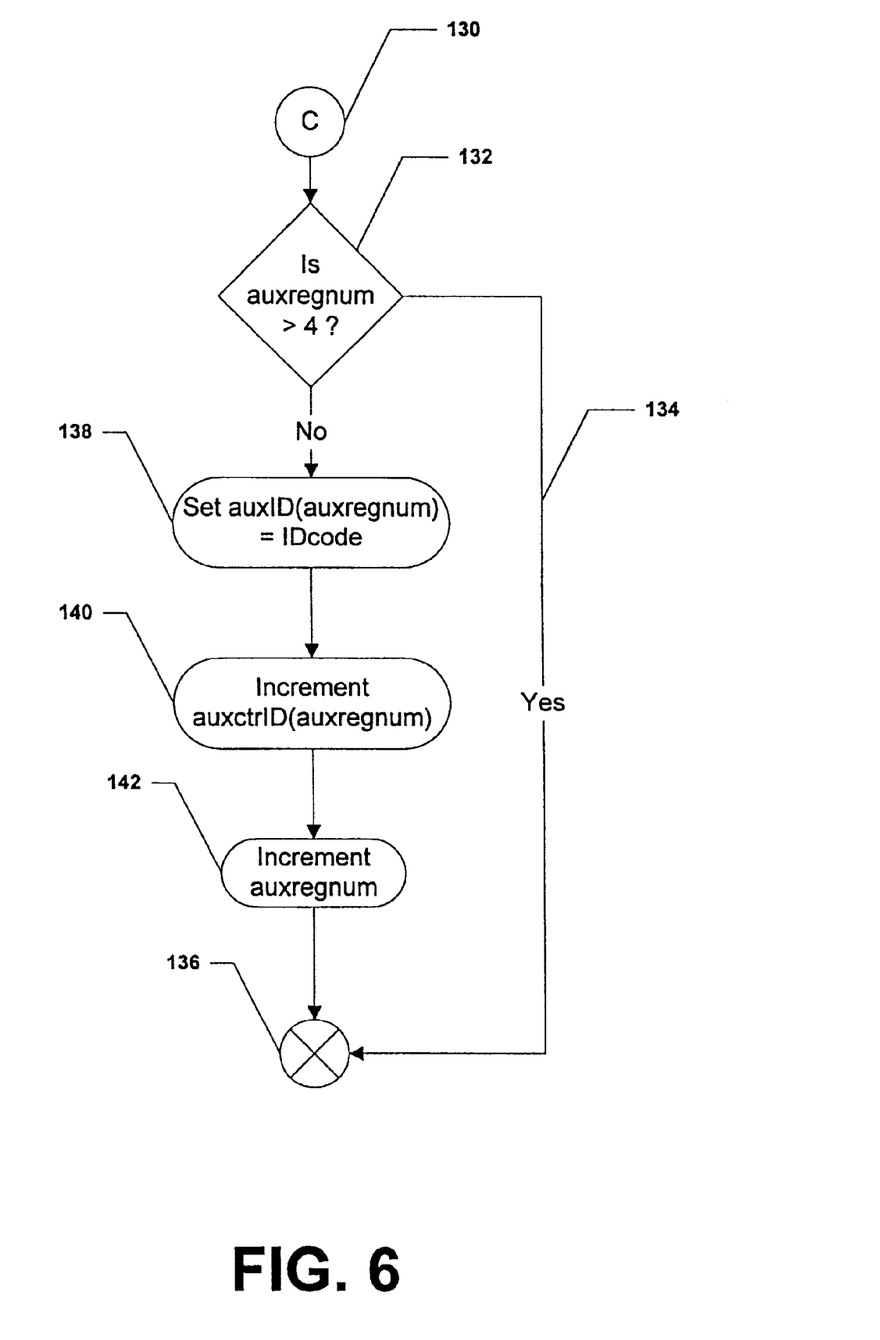
FIG. 6 is a flow chart identifying the event block "C" of FIG. 3.
Figure 7:
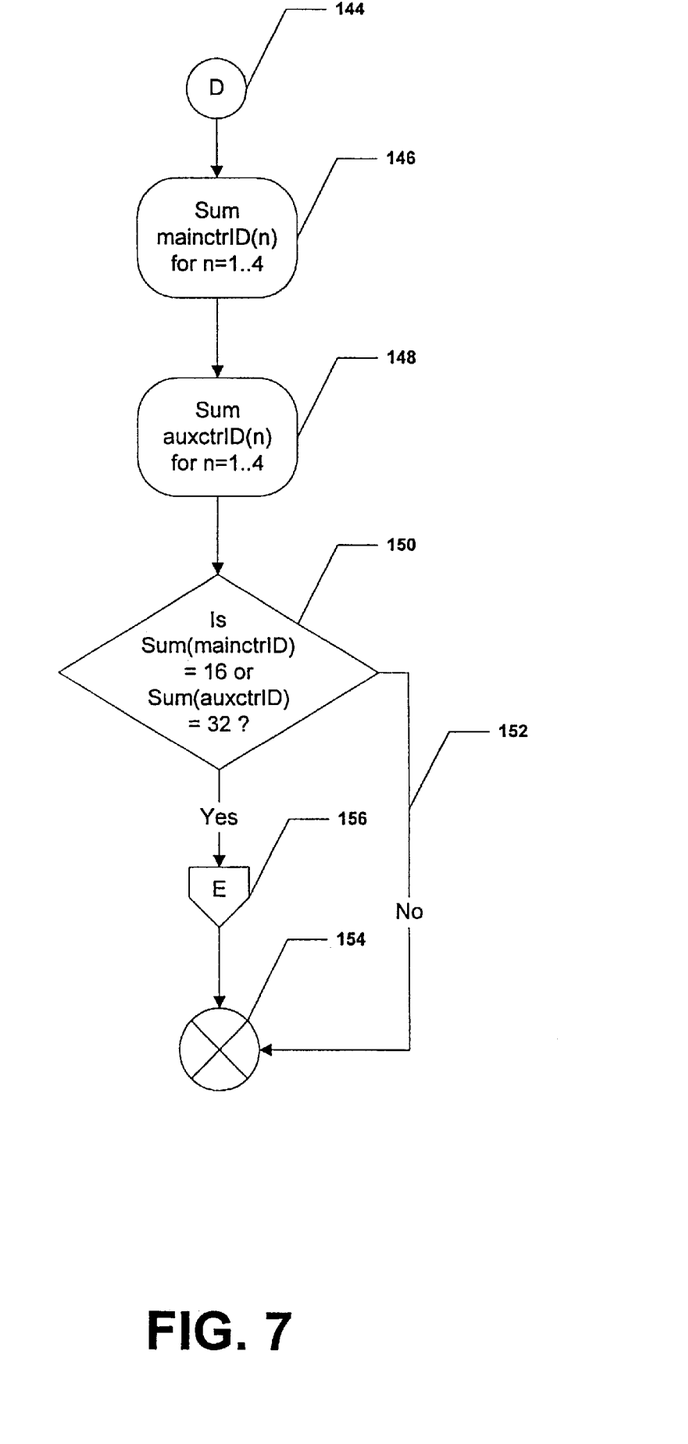
FIG. 7 is a flow chart identifying the event block "D" of FIG. 3.

FIG. 6 shows a flow chart indicating the process steps performed in event block "C" <130> if IDcode does not match any elements of either the main array mainID(n) or the auxiliary array auxID(n). First, the auxiliary register indicator auxregnum is compared to determine whether it exceeds a value of 4 <132>, indicating that all available auxID array elements have been filled with various unique IDcode values. If so <134>, processing returns <136> back to the main routine of FIG. 3 <84>.

If auxregnum does not exceed a value of 4, auxregnum thereby indicates the next array element of auxID(n) to be filled. Therefore, auxID(auxregnum) is set equal to IDcode <138>. In addition, auxctrID(auxregnum) is incremented <140> to note that the particular array element of auxID(auxregnum) has received a valid code (essentially to reflect the activity experienced by this array element by detecting a valid IDcode). Further, the auxiliary register number variable auxregnum is incremented <142> to indicate that the next available register, i.e., auxlD(auxregnum+1), is available to receive a valid IDcode. Processing then returns <136> to the main routine of FIG. 3 <84>.

Processing then passes <86> to event block "D" of FIG. 7 <144>. Each of the counter arrays mainctrID(n) <146> and auxetrID(n) <148> are summed for each of their four array elements. These summed array totals are respectively referred to as Sum(mainctrID(n)) <146> and Sum(auxctrID(n)) <148> for each n from 1 to 4. These values represent the total number of "hits" that a valid IDcode has been received by the system 10 for a particular detection cycle. As noted above, the detection cycle is set as a predetermined number of "hits" and is time-independent. However, the detection cycle comprises a predetermined interval during which the controller does not compare the mainID(n) and auxID(n) arrays, but rather collects valid IDcodes in either the mainID(n) or auxID(n) arrays (the frequency of which is identified in the mainctrID(n) and auxctrID(n) arrays, respectively). When a sufficient number of valid IDcodes have been detected, the compare and transfer routine of event block "E" <156> (FIG. 8) is called. In the example shown in event block "D" (FIG. 7), either 16 valid IDcodes are read into the mainID(n) array (denoted by the Sum(mainctrID(n)) value being at least 16) or 32 valid IDcodes are read into the auxID(n) array (denoted by the Sum(auxctrID(n)) value being at least 32) <150>. These threshold values can be set to values greater than or less than 16 and 32, respectively, without departing from the scope of this invention. Otherwise, processing returns <152> to the point it left the main routine <154>, <86>.

Figure 8:
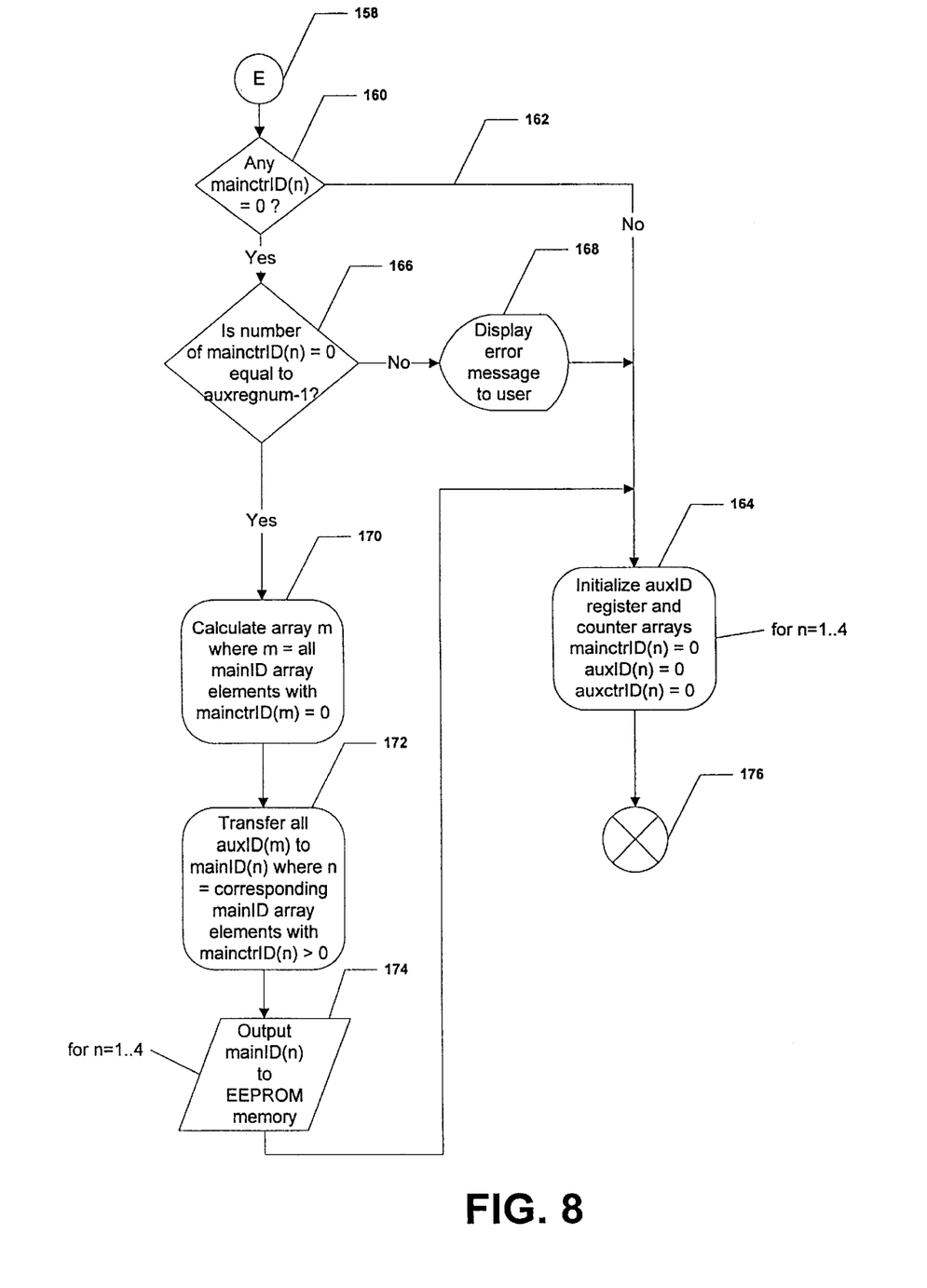
FIG. 8 is a flow chart identifying the event block "E" of FIG. 3.

FIG. 8 shows the event block "E" <156>, <158> where the compare and transfer routine is schematically represented. First, each array element of mainctrID(n) is scanned in a compare step <160> to determine whether an array element thereof is equal to 0. This represents an element of mainID(n) wherein no valid IDcodes were detected.

If no elements of mainctrID(n) are equal to 0 <162>, each of the other arrays are reinitialized, namely, mainctrID(n)=0, auxID(n)=0, and auxctrID(n)=0 for each n from 1 to 4 <164>. Processing then returns <176> to the main routine of FIG. 3 <86>. The system has thereby verified that all IDcodes loaded into the array elements of the main array mainID(n) are valid and the system is reset for another detection cycle.

If the compare step <160> is true, namely, there exists at least one mainID(n) array element where its corresponding counter mainctrID(n) is equal to zero, processing passes to another compare step <166> wherein the number of array elements of mainctrID(n) which equal 0 are counted and compared to be equal to auxregnum−1. This step is a verification step which checks to confirm that the number of "missing" IDcodes from the main array mainID(n) is equal to the number of IDcodes loaded into the auxiliary array auxID(n). If these verification counters are not equal, the system has an error—either too few IDcodes have been detected or too many IDcodes have been detected so that the number of missing IDcodes from the main array is not equal to the number of IDcodes loaded into the auxiliary array <168>. In this event, an error message <168> is displayed to the user on the error indicator 40 and processing passes to the reinitialization step <164> and then returns <176> to the point it left event block "D" <156> (FIG. 7).

If the verification step is true, processing passes to a step <170> wherein an array m(n) of variable size is defined from one array element to four array elements. The array m(n) contains the ordinal identifiers of the array elements of mainID which have "missing" IDcodes, i.e., mainctrID(n) is equal to zero (no activity). For example, if the first and third array elements of mainID had their corresponding counter mainctrID equal to zero, then m(1) would be set equal to 1 (for the first array element) and m(3) would be set equal to 3 (for the third array element). Then, the contents of the filled auxID array elements are transferred <172> to the "inactive" mainID array elements by setting mainID(m(n)) equal to auxID(n) for each n from 1 to auxregnum−1. The "new" mainID array is then output to the RAM memory 36 for each n from 1 to 4 <174>. Processing then passes to the reinitialization step <164> and returns <176> to event block "D" <156>.

Once processing returns to event block "D" <156> (FIG. 7), processing in turn returns <154> to the main routine of FIG. 3 <86>. The system then returns <88> to receive an additional IDcode from the transmitters 12–18 <74> and the process repeats.

It will be appreciated that the event-based automatic learning system described herein is not limited to tire pressure monitoring systems for vehicles. The system disclosed is equally applicable to any wireless system where unique ID codes are used to identify a transmitting source, particularly from multiple transmitters.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for discriminating among ID codes from a group of desired transmitters and ID codes from undesired transmitters wherein the number of transmissions from undesired transmitters is less than the number of transmissions from desired transmitters, each transmitter having a unique ID code, wherein an array has registers adapted to store ID codes corresponding to the group of desired transmitters, the method comprising the steps of:

providing a main array having a plurality of main registers for storing a plurality of main ID codes;

providing a plurality of main ID code counters each associated with one of the plurality of main registers of the main array;

incrementing an appropriate one of the main ID code counters whenever a received ID code is stored in one of the main registers or matches one of the main ID codes already stored in one of the main registers; and clearing any of the main registers whose associated main ID code counter is below a predetermined main ID code counter threshold when the sum of the main ID code counters exceeds a predetermined main event counter threshold, wherein ID codes from undesired transmitters can be cleared from the main array.

2. The method of claim 1, further comprising the steps of:

providing an auxiliary array having a plurality of auxiliary registers for storing a plurality of auxiliary ID codes;

providing a plurality of auxiliary ID code counters each associated with one of the plurality of auxiliary registers of the auxiliary array;

incrementing an appropriate one of the auxiliary ID code counters whenever the received ID code is stored in one of the auxiliary registers or matches one of the auxiliary ID codes already stored in one of the auxiliary registers; and clearing any of the auxiliary registers whose associated auxiliary ID code counter is below a predetermined auxiliary ID code counter threshold when the sum of the auxiliary ID code counters exceeds a predetermined auxiliary event counter threshold, wherein any of the auxiliary registers that are not cleared provide a secondary source of preselected ID codes for the main array.

3. The method of claim 2, further comprising the steps of:

determining whether the auxiliary array has fewer than a predetermined number of the auxiliary ID codes; and storing the received ID code in the auxiliary array as a new auxiliary ID code if the auxiliary array has fewer than the predetermined number of the auxiliary ID codes.

4. The method of claim 3, wherein the determining step includes checking how many of the auxiliary ID code counters are below the auxiliary ID code counter threshold.

5. The method of claim 2, further comprising the step of:

resetting the main ID code counters, the auxiliary ID code counters, and the auxiliary array if all of the main ID code counters associated with the main ID codes in the main array meet or exceed the main ID code counter threshold.

6. The method of claim 3, further comprising the steps of:

resetting the main ID code counters, the auxiliary ID code counters, and the auxiliary array if all of the main ID code counters associated with the main ID codes in the main array meet or exceed the main ID code counter threshold;

determining whether the number of the clear main registers is equal to the number of the new auxiliary ID codes stored in the auxiliary array if at least one of the main ID code counters falls below the main ID code counter threshold;

moving the stored new auxiliary ID codes to the clear main registers in the main array when the number of the clear main registers is equal to the number of the new auxiliary ID codes; and resetting the main ID code counters, the auxiliary ID code counters, and the auxiliary array after the moving step.

7. The method of claim 6, wherein the step of determining whether the auxiliary array has fewer than the predetermined number of auxiliary ID codes includes checking how many of the auxiliary ID code counters are below the auxiliary ID code counter threshold.

8. The method of claim 1, wherein a single main event counter is provided to sum the main ID code counters.

9. The method of claim 2, wherein a single auxiliary event counter is provided to sum the auxiliary ID code counters.

10. An apparatus for discriminating between ID codes from a group of desired transmitters and ID codes from undesired transmitters, each transmitter having a unique ID code, comprising:

a receiver for receiving a plurality of ID codes from a plurality of transmitters;

a memory having a main array that includes a plurality of main registers adapted to store a plurality of main ID codes corresponding to the group of desired transmitters; and a controller for providing:

a plurality of main ID code counters each associated with one of the plurality of main registers of the main array, wherein an appropriate one of the main ID code counters is incremented whenever a received ID code is stored in one of the main registers or matches one of the main ID codes already stored in one of the main registers; and a main threshold detector that causes the controller to clear any of the main registers whose associated main ID code counter is below a predetermined main ID code counter threshold when the sum of the main ID code counters exceeds a predetermined main event counter threshold.

11. The apparatus of claim 10, wherein the memory further includes an auxiliary array having a plurality of auxiliary registers adapted to store a plurality of auxiliary ID codes, and wherein the controller further provides:

a plurality of auxiliary ID code counters each associated with one of the plurality of auxiliary registers of the auxiliary array, wherein an appropriate one of auxiliary ID code counters is incremented whenever the received ID code is stored in one of the auxiliary registers or matches one of the auxiliary ID codes already stored in one of the auxiliary registers; and an auxiliary threshold detector that causes the controller to clear any of the auxiliary registers whose associated auxiliary ID code counter is below a predetermined auxiliary ID code counter threshold when the sum of the auxiliary ID code counters exceeds a predetermined auxiliary event counter threshold, wherein any of the auxiliary registers that are not cleared provide a secondary source of preselected ID codes for the main array.

12. The apparatus of claim 11, wherein the controller checks the memory to determine whether the auxiliary array has fewer than a predetermined number of the auxiliary ID codes and stores the received ID code in the auxiliary array as a new auxiliary ID code if the auxiliary array has fewer than the predetermined number of the auxiliary ID codes.

13. The apparatus of claim 12, wherein the controller checks how many of the auxiliary ID code counters are below the auxiliary ID code counter threshold.

14. The apparatus of claim 11, wherein the controller resets the main ID code counters, the auxiliary ID code counters, and the auxiliary array if all of the main ID code counters associated with the main ID codes in the main array meet or exceed the main ID code counter threshold.

15. The apparatus of claim 12, wherein the controller;

resets the main ID code counters, the auxiliary ID code counters, and the auxiliary array if all of the main ID code counters associated with the main ID codes in the main array meet or exceed the main ID code counter threshold;

determines whether the number of inactive main ID codes is equal to the number of the new auxiliary ID codes stored in the auxiliary array if at least one of the main ID code counters falls below the main ID code counter threshold;

removes the inactive main ID codes if the number of inactive main ID codes is equal to the number of the new auxiliary ID codes;

moves the new auxiliary ID codes to the main array to replace the removed inactive main ID codes; and resets the main ID code counters, the auxiliary ID code counters, and the auxiliary array after moving the new auxiliary ID codes to the main array.

16. The apparatus of claim 15, wherein the controller determines whether the auxiliary array has fewer than the predetermined number of auxiliary ID codes by determining how many of the auxiliary ID code counters are below the auxiliary ID code counter threshold.

17. The apparatus of claim 15, further comprising;

a user indicator coupled to the controller to indicate an error if the controller determines that the number of the inactive main ID codes is not equal to the number of the new auxiliary ID codes stored in the auxiliary array if at least one of the main ID code counters falls below the main ID code counter threshold.

18. The apparatus of claim 10, wherein a single main event counter provides the sum of the main ID code counters.

19. The apparatus of claim 11, wherein a single auxiliary event counter provides the sum of the auxiliary ID code counters.

* * * * *